(12) United States Patent
Okabe (10) Patent No.: US 6,817,874 B2
(45) Date of Patent: Nov. 16, 2004

(54) CARD CONNECTOR DEVICE FOR EJECTING CARD BY SLIDER

(75) Inventor: Yoshifumi Okabe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/464,030

(22) Filed: Jun. 17, 2003

(65) Prior Publication Data

US 2004/0005799 A1 Jan. 8, 2004

(30) Foreign Application Priority Data

Jul. 3, 2002 (JP) ........................................ 2002-194663

(51) Int. Cl.[7] ............................................ H01R 13/62
(52) U.S. Cl. ...................................... 439/157; 439/159
(58) Field of Search ......................... 439/157, 152–160

(56) References Cited

U.S. PATENT DOCUMENTS

6,332,790 B1  12/2001  Ishikawa et al. ............ 439/157

Primary Examiner—Javaid H. Nasri
(74) Attorney, Agent, or Firm—Beyer Weaver & Thomas, LLP (57) ABSTRACT

A card connector device includes a housing, a slider, a coil spring for urging the slider to an ejection direction of a small memory card, and an ejection mechanism for locking the slider at a loading position of the card and releasing a lock state of the slider when the card is once pushed into the depth from its loading position. A protrusion capable of engaging with and disengaging from a recess of the card is formed in the slider. The slider is allowed to rock in a direction in which the protrusion disengages from the recess at an ejection position of the card, and movement of the slider is restricted in a direction in which the protrusion does not disengage from the recess at the loading position of the card.

6 Claims, 14 Drawing Sheets

CARD CONNECTOR DEVICE FOR EJECTING CARD BY SLIDER

BACKGROUND OF THE INVENTION

1. Field of the Invention

This invention relates to a card connector device that is used while a card such as a small memory card is loaded thereto. More particularly, the invention relates to a card connector device constituted in such a fashion that when a card is once pushed into the depth while it is loaded, the card can be ejected.

2. Description of the Related Art

A card connector device is mounted to a variety of electronic appliances such as a digital camera and PDA (Personal Data Assistance: mobile terminal). Electronic data is stored when a card such as a small memory card is load to this card connector device, or electronic data stored in the small memory card is read into the electronic appliance.

A prior art example of the card connector devices of this kind includes a housing having an insertion space into which a card is loaded, a plurality of connection terminals fixed to the housing and exposed inside the insertion space, a slider capable of reciprocating in a loading/ejection direction of the card while keeping engagement with the card, an urging member for urging the slider in the ejection direction of the card, a lock mechanism for locking the slider at a position at which the card is loaded to the housing and a lock release mechanism for releasing the lock state of the slider by pushing once the card from its loading position into the depth.

In the card connector device having the construction described above, the card is held at the loading position as the connection terminals keep pressure contact with the terminals of the card while the card is loaded to the housing. A resilient plate protruding in the card loading direction is provided to the slider. When this resilient plate is resiliently engaged with a recess formed in the side edge of the card, the card in the load process is prevented from accidentally falling off due to external force such as vibration.

In the conventional card connector device described above, the resilient plate provided to the slider is resiliently urged into the recess of the card so as to hold the card at its loading position. To accomplish a reliable holding operation, therefore, the urging force of the resilient plate must be set to a relatively large value. When the resilient plate having large urging force is used, however, fall-off of the card can be effectively prevented but the sliding load of the resilient plate applied to the side edge of the card becomes great, too. Therefore, the card must be pushed into and pulled out against the large sliding load of the resilient plate, and the operation factor of card loading/rejection gets deteriorated. Since the resilient plate must be provided as a discrete component to the slider, the number of components increases, thereby inviting the increase of the production cost. Incidentally, the operation factor of card loading/ejection can be improved when a resilient plate having relatively small urging force is used. However, because the card holding force of the resilient plate drops, the problem that the card is more likely to fall off during its loading process occurs.

SUMMARY OF THE INVENTION

In view of the problems of the prior art technologies described above, the invention aims at providing a card connector device capable of improving an operation factor of card loading/ejection and reliably preventing fall-off of a card under a loaded state.

To accomplish the object described above, a card connector device according to the invention includes a housing having an insertion space into which a card is loaded, a slider capable of reciprocating in a loading/ejection direction of the card while keeping engagement with the card, an urging member for resiliently urging the slider in the ejection direction of the card, a lock mechanism for locking the slider at a position at which the card is loaded into the housing and a lock release mechanism for releasing the lock state of the slider when the card is once pushed into the depth from the loading position thereof, wherein a protrusion capable of engaging with and disengaging from a recess formed at a side edge of the card is formed in the slider, the slider is allowed to undergo displacement at the ejection position of the card in a direction in which the protrusion disengages from the recess, and movement of the slider is restricted in a direction in which the protrusion does not disengage from the recess at the loading position of the card.

According to the card connector device having the construction described above, the protrusion of the slider can be disengaged from the recess of the card when the card is load into and ejected from the housing. Therefore, the protrusion can reduce the sliding load imparted to the side edge of the card and an operation factor of card loading/ejection can be improved. While the card is loaded into the housing, movement of the slider is restricted in a direction in which the protrusion keeping engagement with the recess of the card does not disengage from the recess. Consequently, even when any external force such as vibration acts on the card connector device, the card can be held at the loading position and its accidental fall-off can be prevented reliably. Further, because the card fall-off prevention mechanism can be constituted without the necessity for providing a separate component to the slider, the number of components can be reduced and an economical card connector device can be accomplished.

In the construction described above, the lock mechanism and the lock release mechanism are constituted by an engagement pin one of the ends of which is pivotally supported and the other end of which is allowed to rock, and by a heart-shaped cam groove defined in the housing. The heart-shaped cam groove includes a pin engagement portion for anchoring the other end of the engagement pin and holding the card at the loading position and an ejection path for guiding the other end of the engagement pin in the ejection process of the card from its loading position. Preferably, this card connector device has a construction such that when the card is once pushed into the depth from the loading position, the other end of the engagement pin anchored by the pin engagement portion moves into the ejection path and the lock state of the slider is released. When such a construction is employed, the lock mechanism and the lock release mechanism can be accomplished through a simple construction, and loading and ejection of the card into and from the housing can be made by one-push operation. Therefore, a card connector device having a high operation factor can be accomplished at a low cost.

In the construction described above, it is preferred that a notch and a guide wall for guiding reciprocation of the slider are formed in the housing, the protrusion and a restriction portion are formed at an end of the slider in the card ejection direction, the restriction portion is allowed to oppose the notch at the ejection position of the card, thereby permitting the slider to rock, and the restriction portion is brought into contact with the guide wall at the loading position of the card, thereby restricting rocking of the slider. When such a construction is employed, a mechanism for restricting the protrusion of the slider in a direction in which it does not disengage from the recess of the card can be accomplished with a simple construction.

In the construction described above, it is preferred that a guide protrusion is formed in the slider, a guide groove into which the guide protrusion is fitted is formed in the housing, and the guide groove and the guide wall together restrict movement, in both side directions, of an end portion of the slider in the card loading direction. When such a construction is employed, both rocking of the slider and its reciprocation can be smoothly carried out.

In the construction described above, it is preferred that a component of force urging slantingly the slider in the ejection direction of the card is imparted to the urging member and urges the protrusion of the slider in a direction in which the protrusion engages with the recess of the card. When such a construction is employed, the common urging member allows the slider to conduct both rocking and reciprocation in the ejection direction.

In the construction described above, it is preferred that the protrusion is shaped into a mountain shape protruding towards the insertion space, a front edge of the card pushes a slope of the protrusion on the foreground side during the card loading process to thereby permit the protrusion to rock in a direction in which the protrusion disengages from the recess of the card, an edge of the recess pushes the slope of the protrusion on the depth side during the card ejection process to thereby permit the protrusion to rock in a direction in which the protrusion disengages from the recess of the card. When such a construction is employed, it becomes possible to reliably engage the protrusion with the recess of the card during the loading process of the card and to reliably disengage the protrusion from the recess of the card during the ejection process of the card from the housing.

DESCRIPTION OF THE PREFERRED EMBODIMENT

Figure 1:
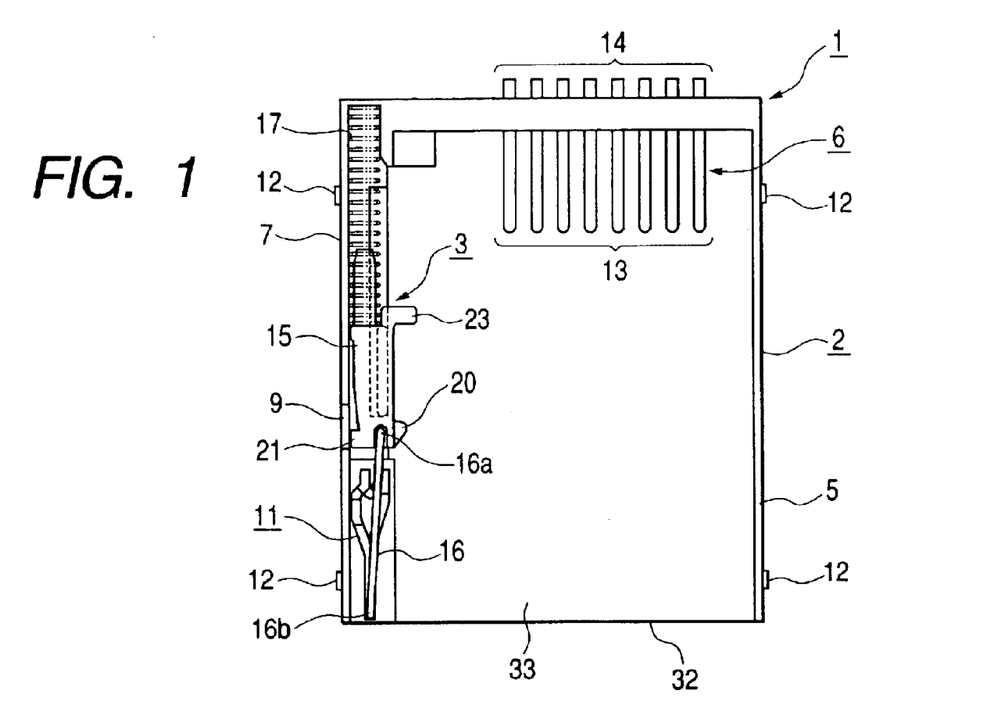
FIG. 1 is a plan view of a card connector device according to an embodiment of the invention.
Figure 2:
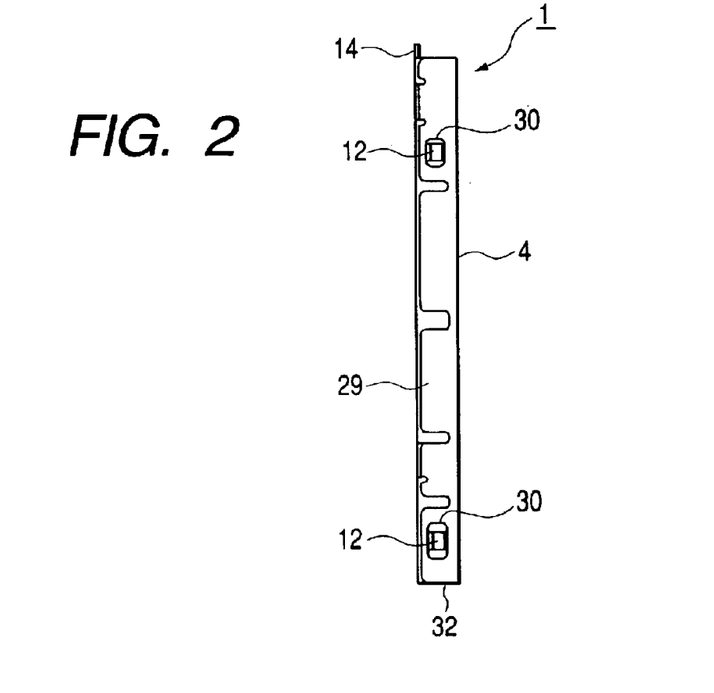
FIG. 2 is a left-hand side view of the card connector device.
Figure 3:
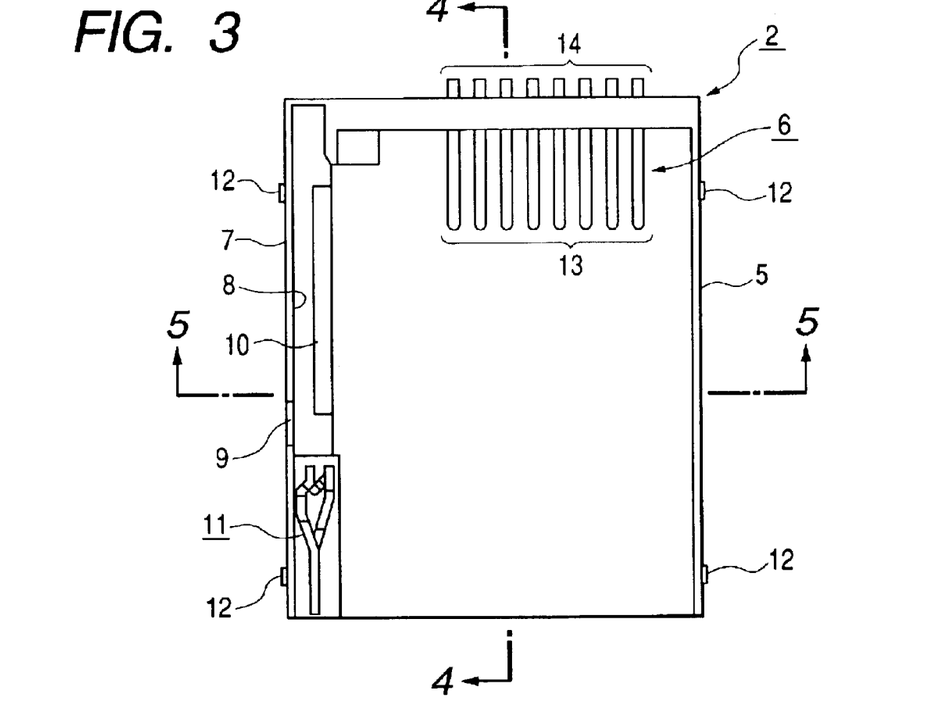
FIG. 3 is a plan view of a housing provided to the card connector device.
Figure 4:
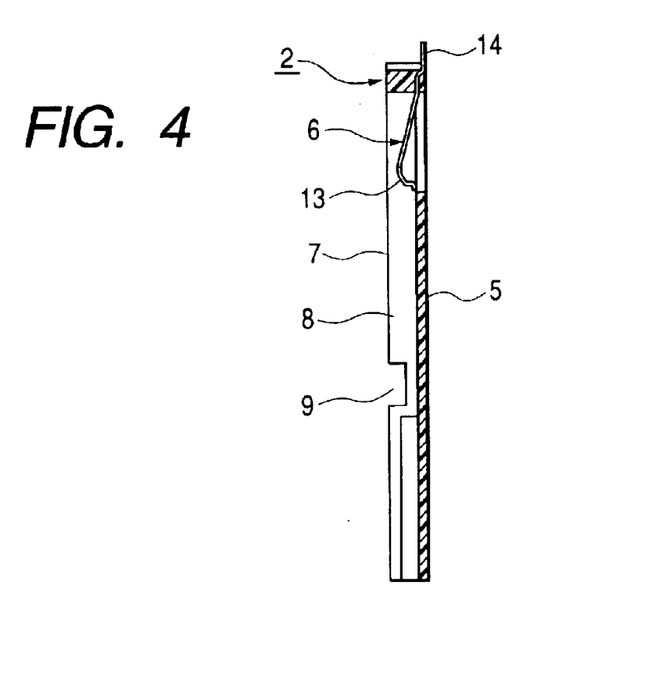
FIG. 4 is a sectional view taken along a line 4—4 of FIG. 3.
Figure 5:
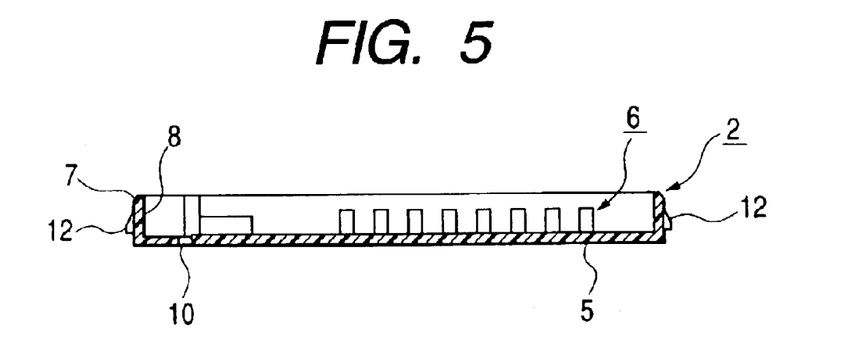
FIG. 5 is a sectional view taken along a line 5—5 of FIG. 3.
Figure 6:
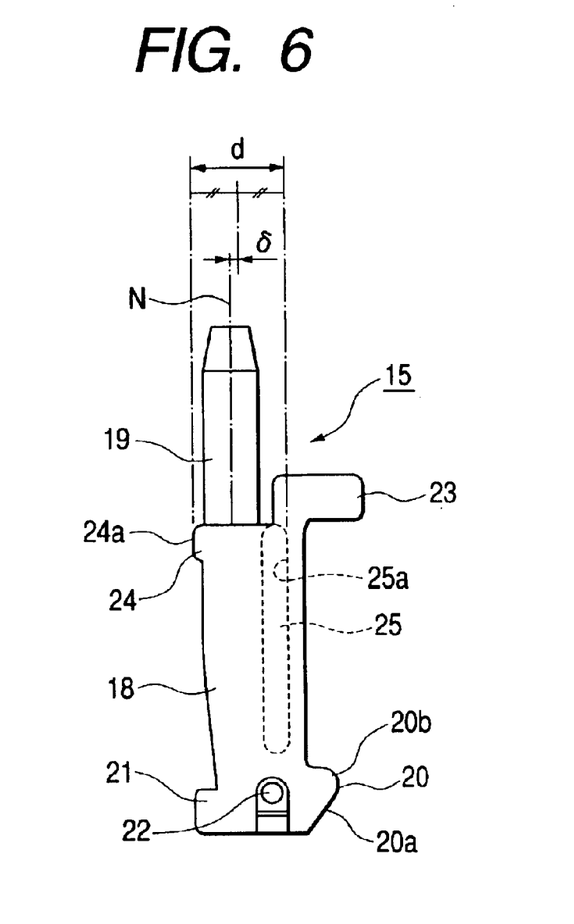
FIG. 6 is a plan view of a slider provided to the card connector device.
Figure 7:
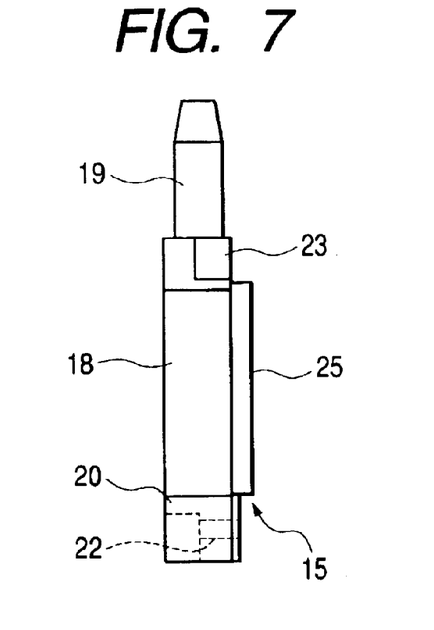
FIG. 7 is a right-hand side view of the slider.
Figure 8:
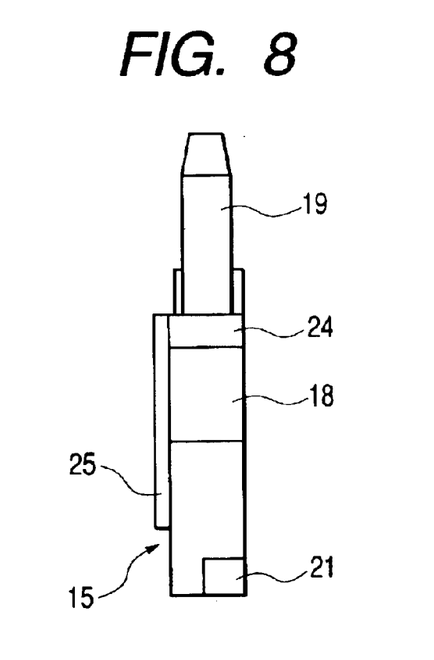
FIG. 8 is a left-hand side view of the slider.
Figure 9:
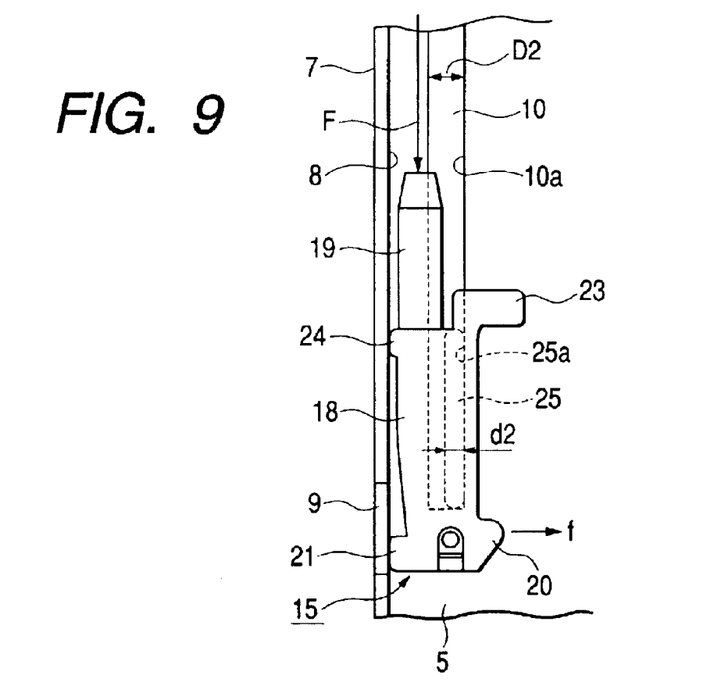
FIG. 9 is a partial plan view for explaining an assembly of the slider and other members.
Figure 10:
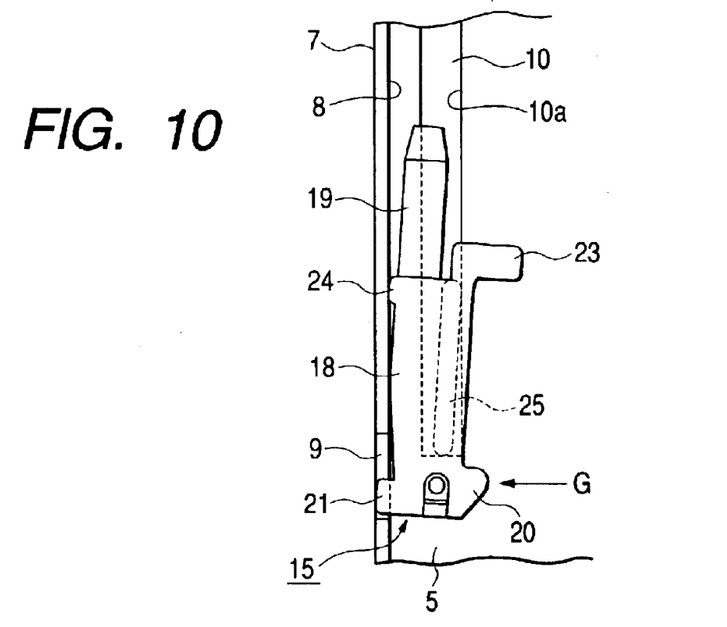
FIG. 10 is a partial plan view for explaining an operation of the slider.
Figure 11:
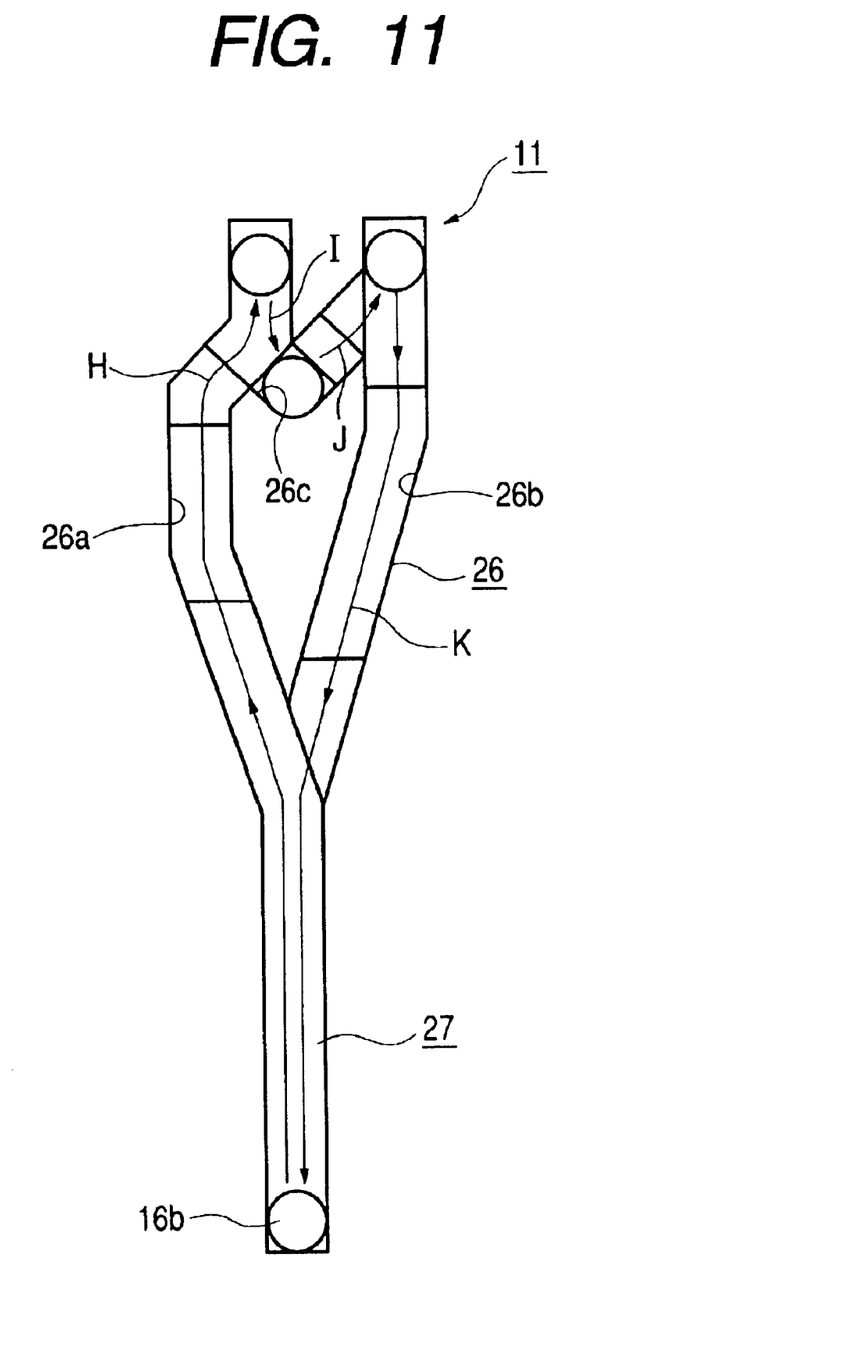
FIG. 11 is a plan view of a cam groove formed in the housing.
Figure 12:
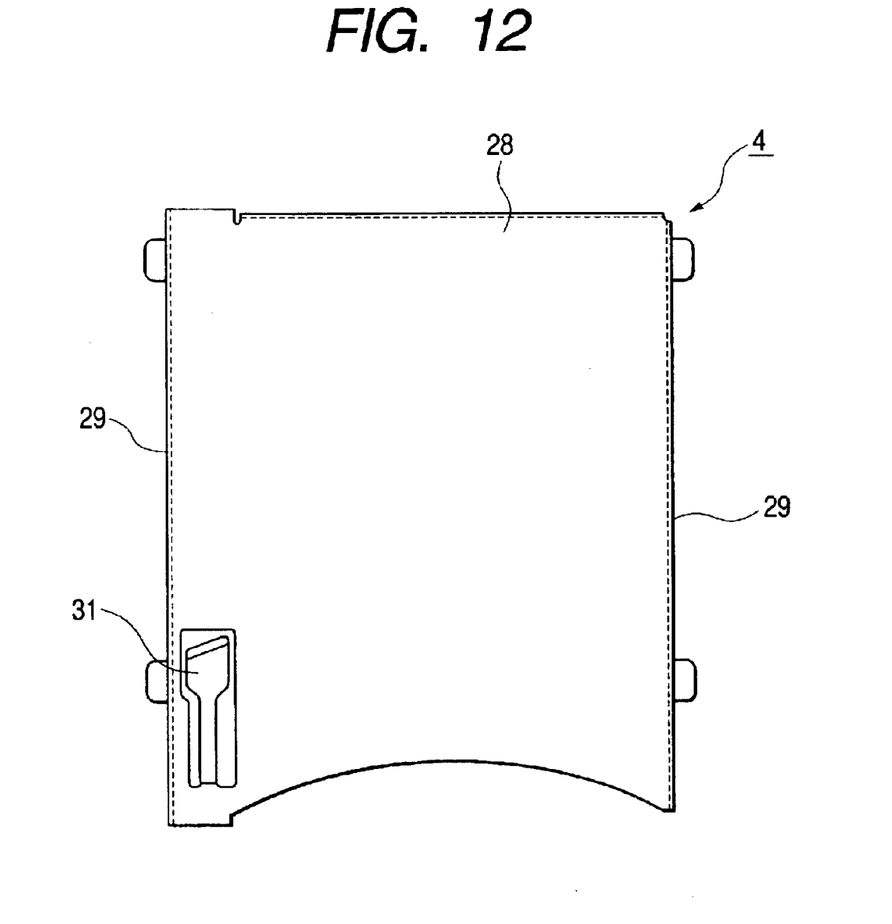
FIG. 12 is a plan view of a cover provided to the card connector device.
Figure 13:
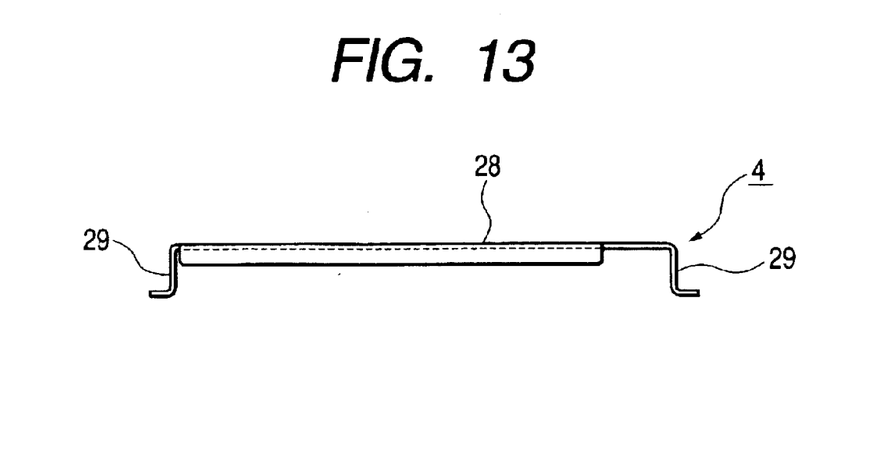
FIG. 13 is a front view of the cover.
Figure 17:
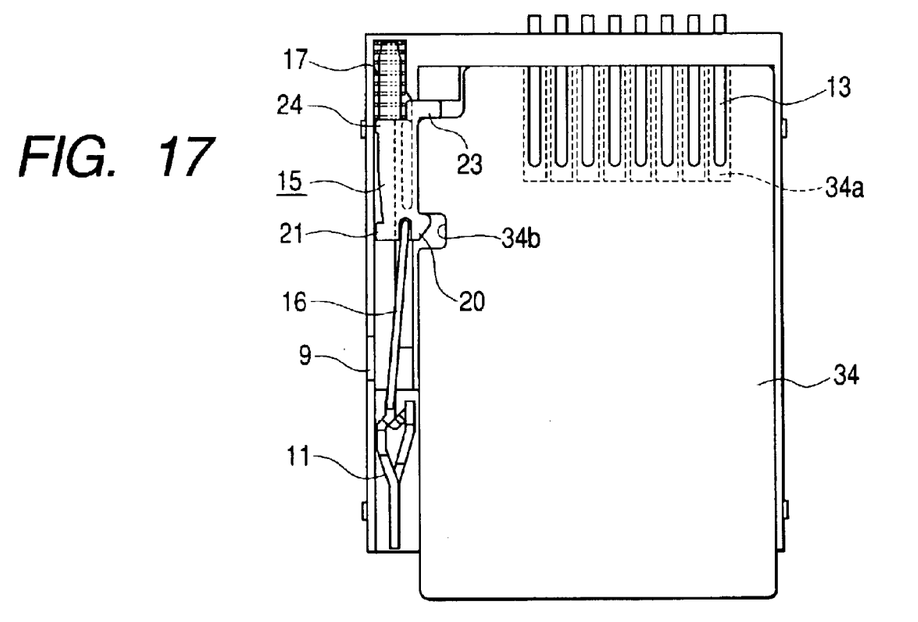
FIG. 17 is an explanatory view showing the fitting operation of the small memory card.
Figure 18:
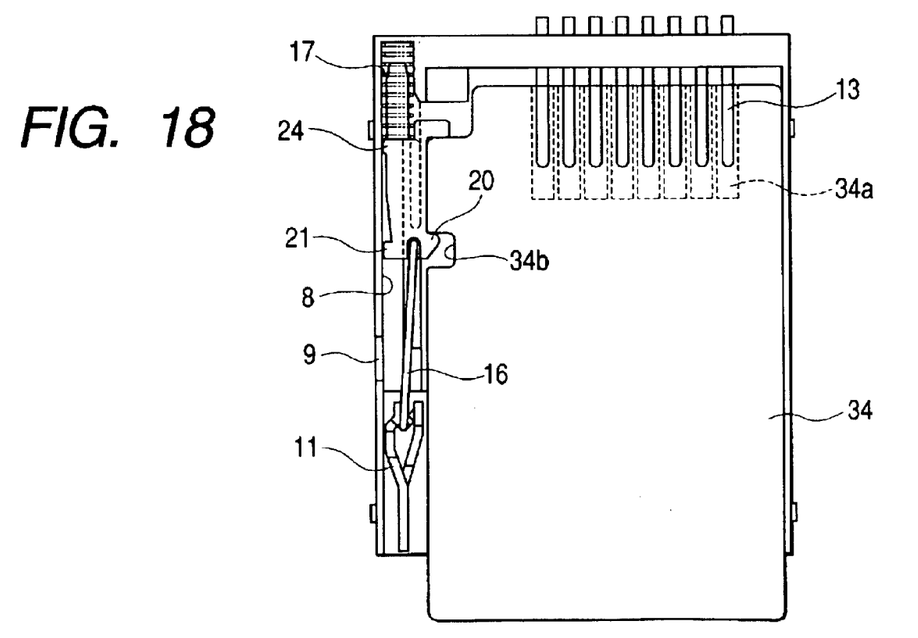
FIG. 18 is an explanatory view showing the fitting operation of the small memory card.
Figure 19:
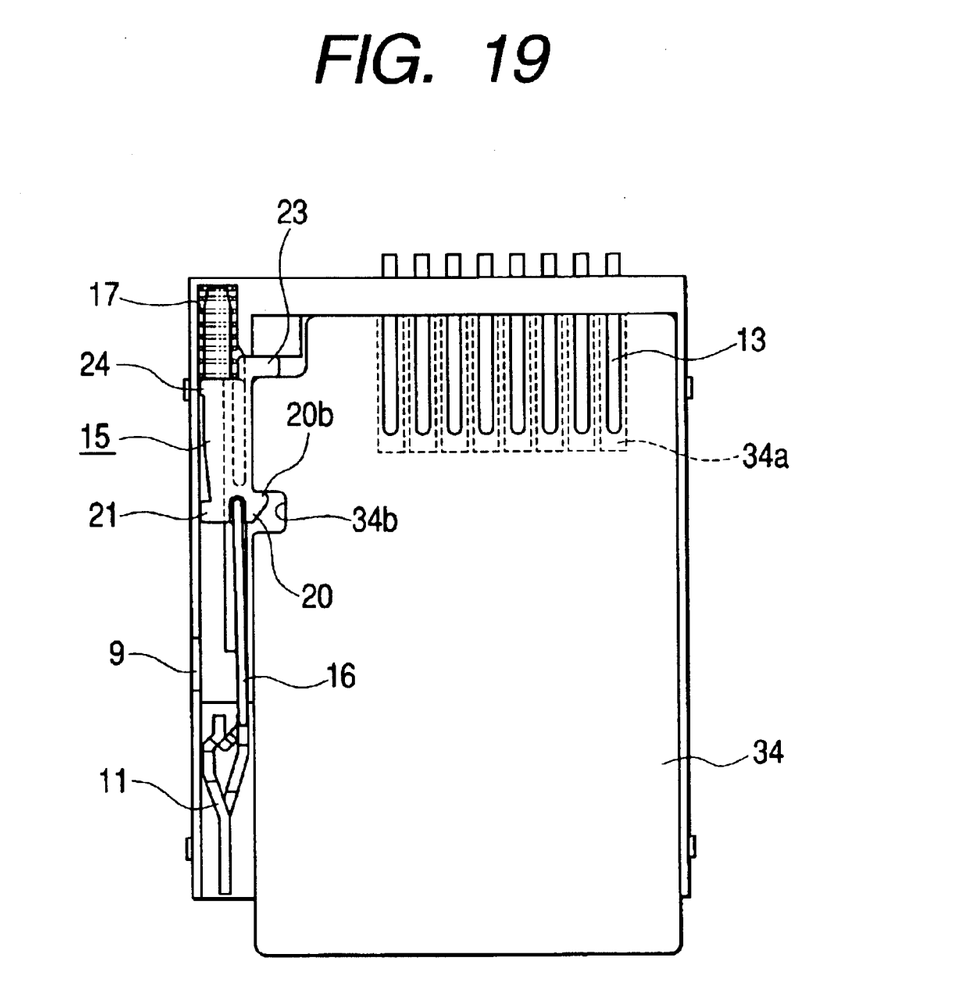
FIG. 19 is an explanatory view showing an ejection operation of the small memory card.
Figure 20:
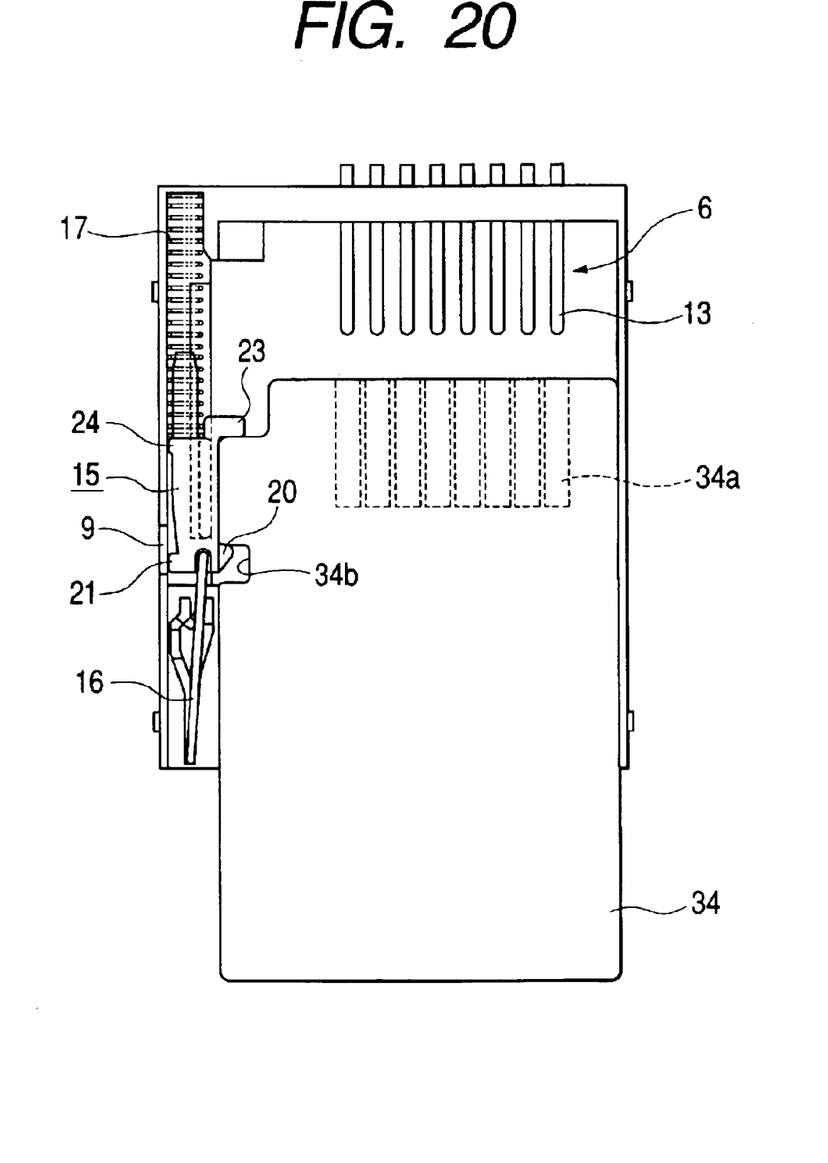
FIG. 20 is an explanatory view showing the ejection operation of the small memory card.
Figure 21:
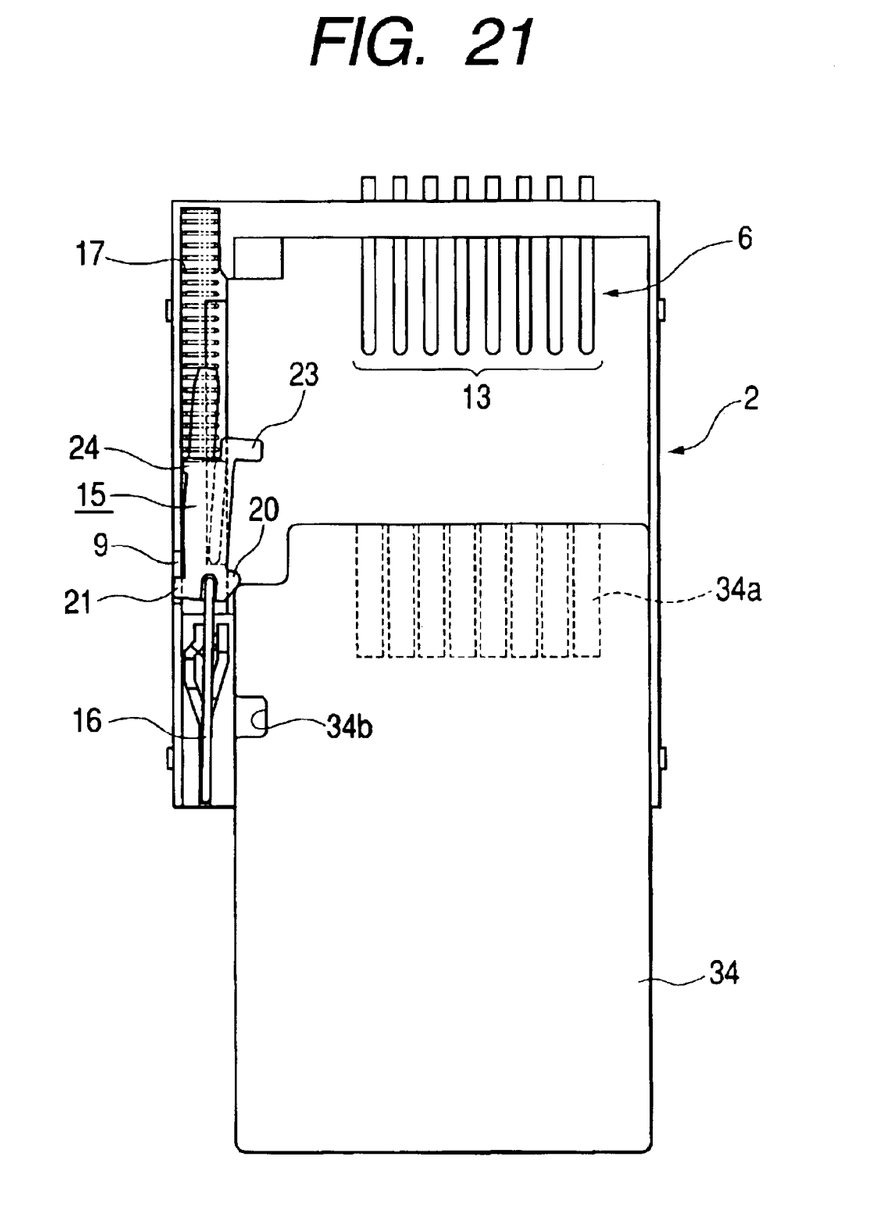
FIG. 21 is an explanatory view showing the ejection operation of the small memory card.

A preferred embodiment of the invention will be explained with reference to the drawings. FIG. 1 is a plan view of a card connector device according to an embodiment of the invention. FIG. 2 is a left-hand side view of the card connector device. FIG. 3 is a plan view of a housing provided to the card connector device. FIG. 4 is a sectional view taken along a line 4—4 in FIG. 3. FIG. 5 is a sectional view taken along a line 5—5 in FIG. 3. FIG. 6 is a plan view of a slider provided to the card connector device. FIG. 7 is a right-hand side view of the slider. FIG. 8 is a left-hand side view of the slider. FIG. 9 is a partial plan view for explaining an assembly state around the slider. FIG. 10 is a partial plan view for explaining an operation of the slider. FIG. 11 is a plan view of a cam groove formed in the housing. FIG. 12 is a plan view of a cover provided to the card connector device. FIG. 13 is a front view of the cover. FIG. 14 to FIG. 18 are explanatory views each showing a fitting operation of a small memory card. FIG. 19 to FIG. 21 are explanatory views each showing an ejection operation of the small memory card.

As shown in FIG. 1 to FIG. 13, the card connector device 1 according to this embodiment mainly includes a housing 2, an ejection mechanism 3 and a cover 4.

As shown in FIG. 3 and FIG. 4, the housing 2 includes a frame 5 made of a synthetic resin and a plurality of connection terminals 6 fixed to the frame 5 by insert molding. On the left side portion of the frame 5 are formed a guide wall 8 positioned on the rear side of a left side wall 7 (upper side in FIG. 3), a notch 9 positioned at the front end portion of the guide wall 8, a rectangular guide groove 10 penetrating through a part of the bottom surface and a cam groove 11 positioned at the front end portion of the bottom surface. The guide wall 8, the notch 9, the guide groove 10 and the cam groove 11 together constitute a part of the ejection mechanism 3. Two convex-shaped engagement portions 12 and 12 are formed on each sidewall surface of the frame 5 in a transverse direction. The connection terminals 6 are arranged with predetermined gaps among them at the rear wall portion of the frame 5. The connection terminals 6 protruding from the front surface of the rear wall constitute a contact portion 13 that comes into resilient contact with terminals of a small memory card that will be later described. The protruding portions from the wall surface on the opposite side constitute soldering portions 14. These soldering portions 14 are soldered to an electronic circuit provided to a circuit board of various electronic appliances not shown in the drawings.

As shown in FIG. 1, the ejection mechanism 3 is provided to the left-hand portion of the housing as viewed in the plan view and includes a slider 15, an engagement pin 16 and a coil spring 17 (urging member). As is apparent from FIG. 6 to FIG. 8, the slider 15 has a substrate portion 18 and a spring engagement shaft 19. The spring engagement shaft 19 protrudes in a cylindrical shape from an end of the substrate portion 18 on the rear side. A protrusion 20, a restriction portion 21 and a bearing hole 22 are formed at the front end of the substrate portion 18. The protrusion 20 has a mountain shape as viewed in the plan view and has slopes 20a and 20b on both of its front and rear sides. The restriction portion 21 is positioned on the opposite side to the protrusion 20 and is shaped into a rectangular shape as viewed in the plan view. The bearing hole 22 is so formed as to penetrate through the upper and lower surfaces of the protrusion 20. An engagement portion 23 capable of engaging with a front edge of the small memory card and a convex 24 positioned on the same side as the restriction portion 21 are formed at the rear end of the substrate portion 18. Further, a guide protrusion 25 of an ellipse form being longitudinal in the length-wise direction protrudes at the backside of the substrate portion 18. Incidentally, as shown in FIG. 6, the slider 15 is formed in such a fashion that a center line N of the spring engagement shaft 19 deviates leftward by a distance δ from the center point of a distance d between a distal end surface 24a of the convex portion 24 and an outer wall surface 25a of the guide protrusion 25.

As shown in FIG. 9, the slider 15 is put on the bottom surface of the frame 5. Under this state, the guide protrusion 25 is fitted into the guide groove 10, and the restriction portion 21 and the protrusion 24 oppose the guide wall 8. Therefore, the guide wall 8 and the outer wall 10a of the guide groove 10 restrict the movement of the slider 15 in the width-wise direction and the slider 15 can smoothly reciprocate in the loading/ejecting direction of the small memory card. Since the width d2 of the guide protrusion 25 is so set as to be smaller than the width D2 of the guide groove 10, however, the guide protrusion 25 can move in its width-wise direction inside the guide groove 10 only when the restriction portion 21 opposes the notch 9 of the guide wall 8. In consequence, the front edge of the slider 15 can rock with the convex portion 24 at the rear end as a support point. One of the ends of the coil spring 17 is fitted to the spring engagement shaft 23 of the slider 15, and the other end of the coil spring 17 is anchored to the rear wall of the frame 5 (see FIG. 1). Therefore, the slider 15 is resiliently urged in the card ejecting direction. Since the distal end surface of the guide protrusion 25 comes into contact with the front wall of the guide groove 10, the slider 15 is kept at the ejection position (under the initial state) of the small memory card. The notch 9 described above is so arranged as to oppose the position of the restriction portion 21 under this initial state. Further, because the urging force F of the coil spring 17 is allowed to act on the center of the spring engagement shaft 19, a moment round the center of the rear of the slider 15 (counter-clockwise) is imparted to the slider 15 and urges the protrusion 20 in the direction indicated by an arrow f in FIG. 9.

When force G that pushes outward the protrusion 20 under the initial state of the slider 15 as shown in FIG. 10, the restriction portion 21 escapes into the notch 9 with the result that the slider 15 can rock clockwise with the convex portion 24 at the rear end as the support point. However, when the slider 15 moves to positions other than the position of the initial state, the rocking operation of the slider 15 is restricted because the guide wall 8 and the outer sidewall 10a of the guide groove 10 restrict the movement of the slider 15 in the transverse direction as described already.

As shown in FIG. 1, one of the ends 16a of the engagement pin 16 is pivotally supported by the bearing hole 22 (see FIG. 6) formed in the slider 15 so that the other end 16b of the engagement pin 16 on its free end side can rock. A heart-shaped cam groove 26 and a guide groove 27 are arranged in the cam groove 11 as shown in FIG. 11. The guide groove 27 communicates with the heart-shaped cam groove 26 and extends forward. The heart-shaped cam groove 26 includes an insertion path 26a and an ejection path 26b of the other end 16b of the engagement pin 16 and a pin engagement portion 26c for anchoring the other end 16b and holding the small memory card at the loading position.

As shown in FIG. 12 and FIG. 13, the cover 4 is formed of a metal sheet and includes a ceiling plate 28 having substantially a rectangular shape as viewed in a plan view and side plates 29 and 29 formed by bending at right angles the right and left opposing edges of the ceiling plate 28 in its transverse direction. A cut-up plate 31 is formed at a left edge in front of the ceiling plate 28. Two rectangular holes 30 and 30 are defined in each side plate 29, 29 (see FIG. 2). The cover 4 is fitted in such a fashion that the ceiling plate 28 covers the upper part of the housing 2 and the side plates 29 and 29 cover both side surfaces of the housing 2. When the rectangular holes 30 and 30 of each side plate 29, 29 is snap-fixed to the engagement portion 12, 12 on each sidewall surface, the cover 4 is prevented from falling off from the housing 2. The cut-up plate 31 formed in the ceiling plate 28 is so arranged as to partially cover the cam groove 11 of the frame 5 and resiliently pushes the engagement pin 16 in the direction of the cam groove 11. In consequence, the other end 16b of the engagement pin 16 can reliably slide on the bottom surface of the cam groove 11 and the cam operation can be carried out stably. Incidentally, an insertion space 33 is defined between the housing 2 and the cover 4 (see FIG. 1) and the small memory card can be inserted from the side of the open end 32 (card loading port) into the insertion space 33.

Next, the operation of the card connector device 1 having the construction described above will be explained. First, the loading operation of the small memory card into the card connector device 1 will be explained with reference to FIG. 14 to FIG. 18.

To begin with, the small memory card as an example of the cards used for the card connector device 1 will be explained. This small memory card 34 is a rectangular sheet-like member. A plurality of terminals 34a having predetermined gaps among them in the transverse direction is arranged on the lower surface of the distal end of the sheet-like member. Recesses 34b capable of engaging with and disengaging from the protrusions 20 formed on the slider 15 are arranged on one of the side edges.

Under the initial state of the card connector device 1 according to this embodiment, the urging force of the coil spring 17 holds the slider 15 at the foreground position of its moving range. The protrusion 20 is so urged as to protrude into the insertion space 33 into which the small memory card 34 is loaded. The other end 16b of the engagement pin 16 is positioned at this time at the front end of the guide groove 27 shown in FIG. 11.

Figure 14:
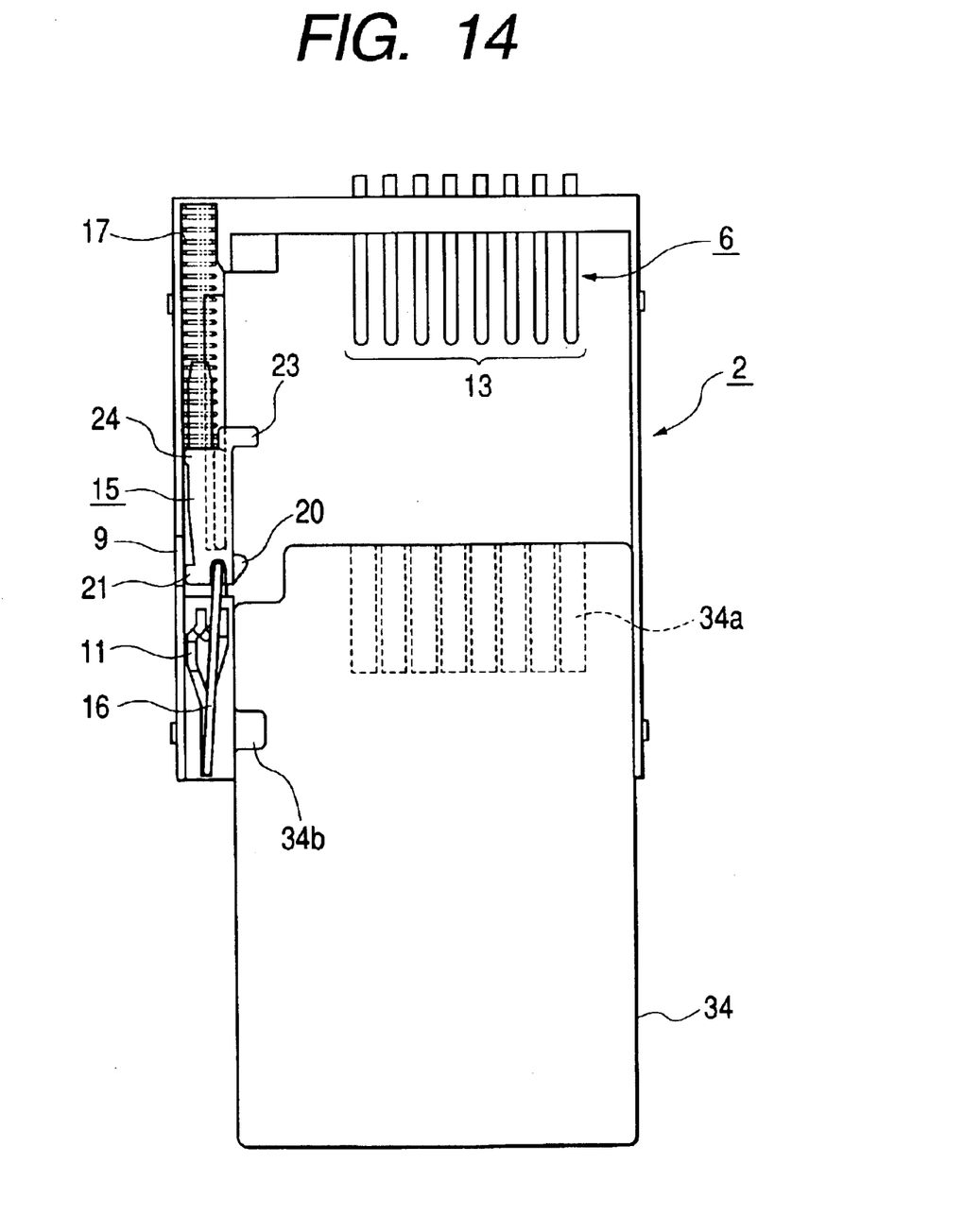
FIG. 14 is an explanatory view showing a fitting operation of a small memory card.
Figure 15:
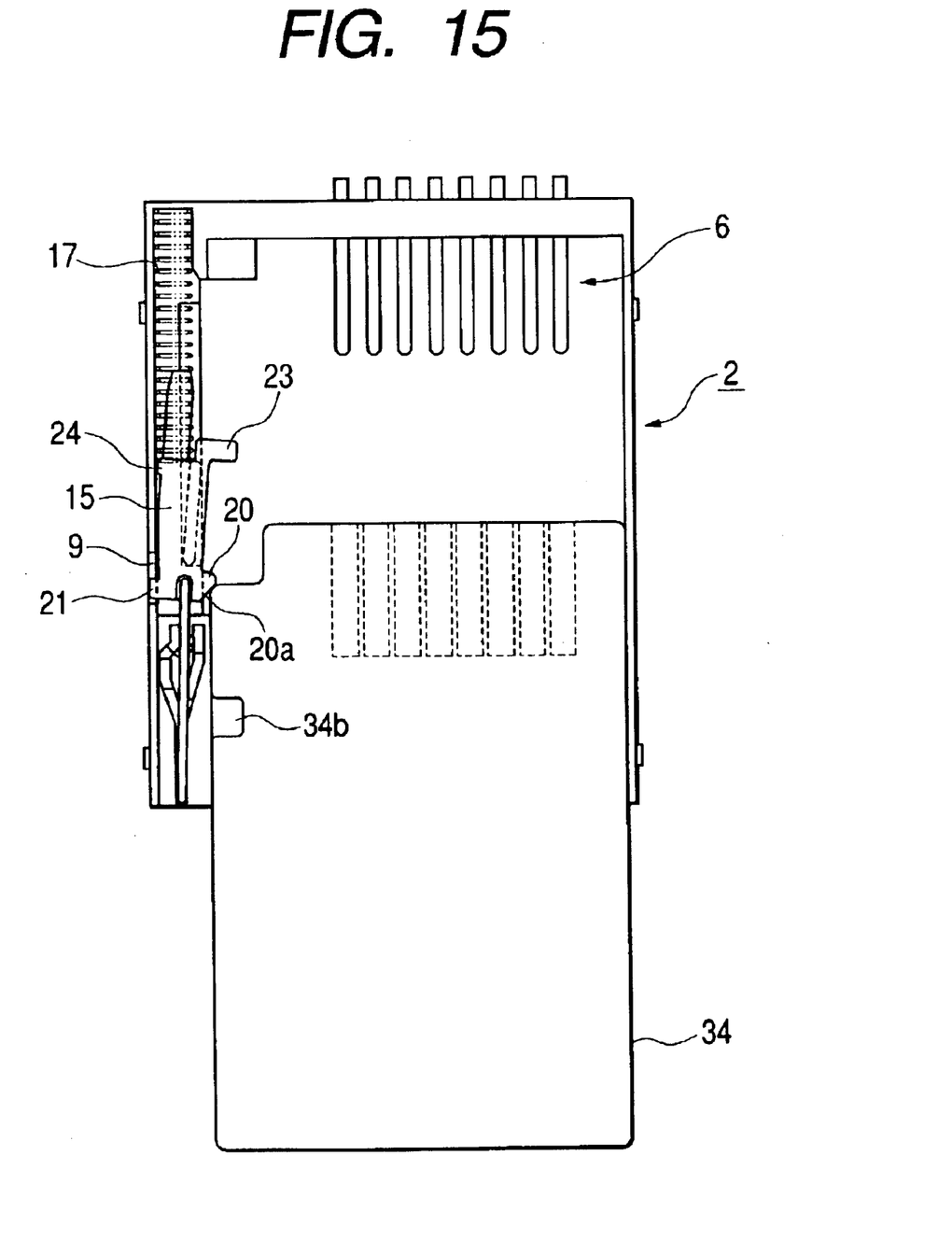
FIG. 15 is an explanatory view showing the fitting operation of the small memory card.

FIG. 14 shows the state immediately after an operator manually loads the small memory card 34 into the card loading port 32. In this state, the protrusion 20 remains protruded into the insertion space 33. When the rear end of the small memory card 34 is pushed from this state, the front edge of the small memory card 34 pushes the slope 20a of the protrusion 20 on the front side and the slider 15 rocks clockwise with the convex portion 24 as the support point. In other words, the small memory card 34 during loading pushes outward the protrusion 20, so that the restriction portion 21 moves inside the notch 9 and the protrusion 20 undergoes displacement in the direction away from the small memory card 34. Consequently, the sliding load applied to the side edges of the small memory card during insertion can be reduced.

Figure 16:
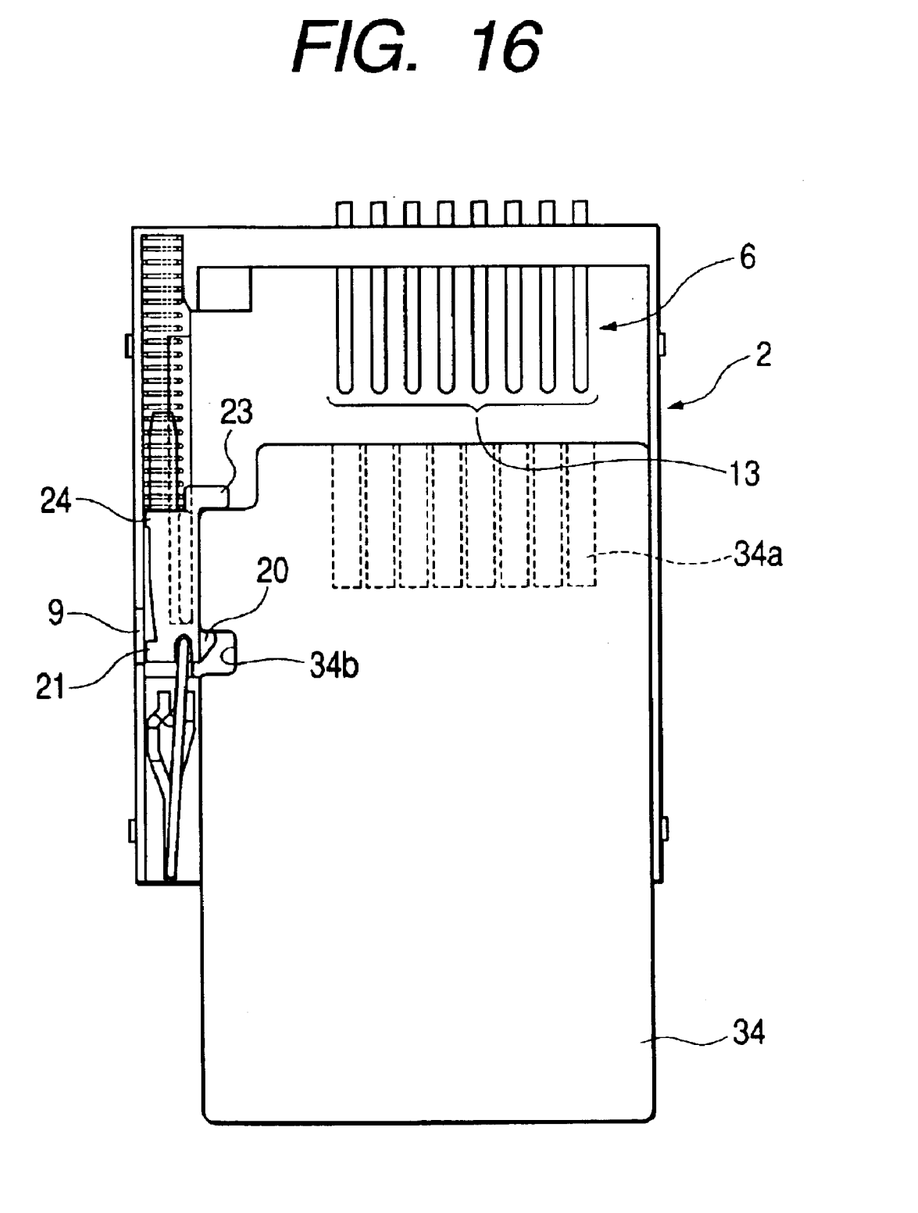
FIG. 16 is an explanatory view showing the fitting operation of the small memory card.

As the small memory card 34 is further pushed in, the protrusion 20 is kept under the state where it is pushed by the side edges of the small memory card 34 until the front edge of the small memory card 34 comes into contact with the engagement portion 23 of the slider 15. When the front edge of the small memory card 34 comes into contact with the engagement portion 23 of the slider 15, the small memory card 34 pushes the engagement portion 23 as shown in FIG. 16 and the slider 15 rocks counter-clockwise with the convex portion 24 as the support point. As a result, the protrusion 20 engages with the recess 34b of the small memory card 34. When the small memory card 34 is further pushed in, the slider 15 follows the movement of the small memory card 34. The terminals 34a of the small memory card 34 come into contact with the contact portion 13 of the connection terminals 6 during this movement process. The small memory card 34 is further pushed until its front edge comes into contact with the rear wall surface of the frame 5 as shown in FIG. 17.

The other end 16b of the engagement pin 16 moves from the guide groove 27 into the insertion path 26a of the heart-shaped cam groove 26 due to the push operation of the small memory card 34 as indicated by an arrow H in FIG. 11 and further moves into the depth beyond the pin engagement portion 26c. When the push operation force to the small memory card 34 is released under this state, the urging force of the coil spring 17 pushes back the slider 15 towards the foreground. Consequently, the other end 16b of the engagement pin 16 moves to the pin engagement portion 26c and is anchored as indicated by an arrow I in FIG. 11. As a result, both slider 15 and small memory card 34 are pushed back towards the foreground with the movement of the engagement pin 16 as shown in FIG. 18, and the small memory card 34 is as such held at the card loading position under the state where each terminal 34a keeps contact with the contact portion 13. Because the restriction portion 21 of the slider 15 keeps contact with the guide wall 8 at this card loading position, the movement of the slider 15 in the transverse direction is restricted. In other words, the protrusion 20 that engages with the recess 34b of the small memory card 34 is inhibited from moving in the releasing direction from the recess 34b, and the small memory card 34 is reliably prevented from falling off accidentally from the housing 2 even when external force such as vibration is imparted to the card connector device 1.

Next, the ejection operation of the small memory card 34 loaded into the housing 2 will be explained with reference to FIG. 18 to FIG. 21.

FIG. 18 shows the state where the small memory card 34 is loaded into the housing 2 as already described. When the operator manually pushes the rear end surface of the small memory card 34 from this state, the small memory card 34 moves once into the depth from the loading position and strikes the rear end wall surface of the housing 2 as shown in FIG. 19. Because the slider 15 moves into the depth with this movement of the small memory card 34, too, the other end 16b of the engagement pin 16 disengages from the anchor portion 26c and moves into the ejection path 26b at the depth as indicated by an arrow J in FIG. 11. The lock state of the slider 15 is released under this state. Therefore, when the push operation force of the small memory card 34 is removed, the urging force of the coil spring 17 pushes back the slider 15 to the foreground to bring the slider 15 to the initial state.

When the slider 15 is pushed back to the foreground in this way, the other end 16b of the engagement pin 16 moves from the ejection path 26b into the guide groove 27 as indicated by an arrow K in FIG. 11. Each terminal 34a of the small memory card 34 disengages from the contact portion 13 during this process. When the other end 16b of the engagement pin 16 moves to the front edge of the guide groove 27 as shown in FIG. 20, the small memory card 34 moves from the card loading port 32 to the ejection position at which the rear end protrudes. When the operator pinches the rear end of the small memory card 34 and pulls it backward, the edge of the recess 34a pushes the slope 20b at the rear part of the protrusion 20. Consequently, the slider 15 rocks clockwise with the convex portion 24 as the support point and the protrusion 20 disengages from the recess 34b. In other words, the small memory card 34 pushes outwards the protrusion 20 during its ejection process, so that the restriction portion 21 moves into the notch 9 and the protrusion 20 undergoes displacement in the direction away from the small memory card 34. Therefore, the sliding load imparted to the side edge of the small memory card 34 can be reduced at the time of ejection of the small memory card 34 from the card loading portion 32, too.

As is apparent from FIG. 3, the guide groove 10 penetrating through the bottom surface is formed adjacent to the guide wall 8 extending upright from the bottom surface of the frame 5 in this embodiment. Therefore, the left sidewall 7 constituting the guide wall 8 is likely to undergo outward displacement. Because such a construction is employed, even when large force is applied so as to forcibly pull out the small memory card 34 under the loading state of the small memory card 34 shown in FIG. 18, the slider 15 can escape outward as a whole because the left sidewall 7 undergoes deformation. In other words, because the protrusion 20 undergoes displacement in the direction away from the recess 34b of the small memory card 34 during the forcible pull-out operation of the small memory card 34, the small memory card 34 can be pulled out under a relatively small load state, and breakage of the slider 15, etc, can be avoided.

The invention is executed in the form described above and provides the following advantages.

When the card is loaded into and rejected from the housing, the protrusion of the slider can be released from the recess of the card. Therefore, the sliding load the protrusion imparts to the side edge of the card can be reduced and the operation factor of the card loading/rejection operation can be improved. Under the state where the card is loaded into the housing, the protrusion engaging with the recess of the card restricts the movement of the slider in the direction in which the protrusion does not leave the recess. Therefore, even when external force such as vibration acts on the card connector device, the card can be held at the fitting position and its accidental fall-off can be reliably prevented. Furthermore, the card fall-off prevention mechanism can be constituted without providing separate components to the slider, the number of components can be reduced, and an economical card connector device can be accomplished.

What is claimed is:

1. A card connector device including a housing having an insertion space into which a card is loaded, a slider capable of reciprocating in loading and ejection directions of said card while keeping engagement with said card, an urging member for resiliently urging said slider in the ejection direction of said card, a lock mechanism for locking said slider at a position at which said card is loaded into said housing, and a lock release mechanism for releasing the lock state of said slider when said card is once pushed into the depth from the loading position thereof, wherein a protrusion capable of engaging with and disengaging from a recess formed at a side edge of said card is formed in said slider, said slider is allowed to undergo displacement at the ejection position of said card in a direction in which said protrusion disengages from said recess, and movement of said slider is restricted in a direction in which said protrusion does not disengage from said recess at the loading position of said card.

2. A card connector device according to claim 1, wherein said lock mechanism and said lock release mechanism are constituted by an engagement pin so supported by said slider as to be capable of rocking and a heart-shaped cam groove formed in said housing, said heart-shaped cam groove includes a pin engagement portion for anchoring a free end of said engagement pin and holding said card at the loading position and an ejection path for guiding the free end of said engagement pin during an ejection process of said card from the loading position, and the free end of said engagement pin anchored to said pin engagement portion moves to said ejection path to release the lock state of said slider when said card is pushed once into the depth from the loading position thereof.

3. A card connector device according to claim 1, wherein a notch and a guide wall for guiding reciprocation of said slider are formed in said housing, said protrusion and a restriction portion are formed at an end of said slider in the card ejection direction, said restriction portion is allowed to oppose said notch at the ejection position of said card, thereby permitting said slider to rock, and said restriction portion is brought into contact with said guide wall at the loading position of said card, thereby restricting rocking of said slider.

4. A card connector device according to claim 3, wherein a guide protrusion is formed in said slider, a guide groove into which said guide protrusion is fitted is formed in said housing, and said guide groove and said guide wall together restrict movement, in both side directions, of an end portion of said slider in the card loading direction.

5. A card connector device according to claim 3, wherein a component of force urging slantingly said slider in the ejection direction of said card is imparted to said urging member and urges said protrusion of said slider in a direction in which said protrusion engages with said recess of said card.

6. A card connector device according to claim 5, wherein said protrusion is shaped into a mountain shape protruding towards said insertion space, a front edge of said card pushes a slope of said protrusion on the foreground side during the card loading process to thereby permit said protrusion to rock in a direction in which said protrusion disengages from said recess of said card, an edge of said recess pushes the slope of said protrusion on the depth side during the card ejection process to thereby permit said protrusion to rock in a direction in which said protrusion disengages from said recess of said card.

* * * * *